W. L. LUBBOCK.
GARBAGE RECEPTACLE.
APPLICATION FILED AUG. 9, 1912.

1,061,390.

Patented May 13, 1913.

WITNESSES:

INVENTOR
William L. Lubbock
BY
Hardway & Cathey
ATTORNEYS

UNITED STATES PATENT OFFICE.

WILLIAM L. LUBBOCK, OF HOUSTON, TEXAS.

GARBAGE-RECEPTACLE.

1,061,390.　　　　Specification of Letters Patent.　　Patented May 13, 1913.

Application filed August 9, 1912. Serial No. 714,235.

*To all whom it may concern:*

Be it known that I, WILLIAM L. LUBBOCK, a citizen of the United States, residing at Houston, in the county of Harris and State of Texas, have invented certain new and useful Improvements in Garbage-Receptacles, of which the following is a specification.

My invention relates to new and useful improvements in garbage receptacles.

The object of the invention is to provide a device of the character described having a bail which is hinged thereto and a covering therefor arranged to be held securely thereon by said bail when it is desired to close the receptacle, but which will readily slide upon the bail when it is desired to open the receptacle and empty the garbage therefrom.

Another object of the invention is to provide a receptacle which is reinforced by vertically extending ribs which makes the receptacle more durable.

With the above and other objects in view, the invention has particular relation to certain novel features of construction, operation and arrangement of parts, an example of which is given in this specification and illustrated in the accompanying drawing; wherein—

Figure 1:
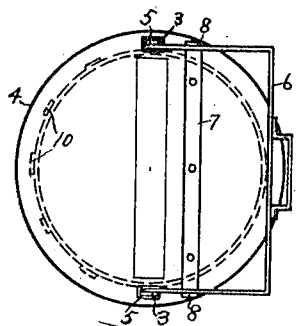
Figure 2:
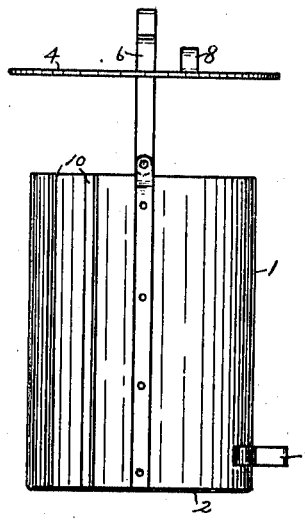
Figure 3:
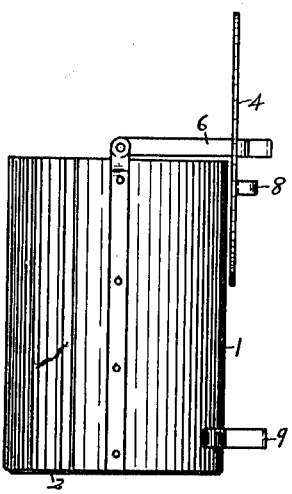

Figure 1 is a plan view of the receptacle showing the lid locked thereon. Fig. 2 is a side elevation thereof, showing the covering elevated on the bail and in position to be opened. Fig. 3 is a side elevation thereof showing the receptacle opened and in position to be emptied.

Referring now more particularly to the drawing, the numeral 1 designates the receptacle which is preferably cylindrical in shape and formed of sheet metal and provided with a suitable bottom 2. Riveted upon opposite sides of the receptacle are vertically extending braces 3, 3, whose upper ends project some distance above the top thereof.

The numeral 4 refers to a circular covering provided with slots 5, 5 on opposite sides thereon, through which the upper ends of the braces 3, 3 extend.

The numeral 6 refers to a bail whose ends are hinged to the upwardly projecting upper ends of the braces 3, 3.

The covering 4 has a cross brace 7 riveted thereto whose ends are up-turned, forming clamps 8, 8, the distance between which being slightly less than the width of the bail 6 so that when the covering is placed upon the receptacle and the bail forced over so as to lie down upon said covering, the sides of the bail may be forced between said clamps which will grip the same and hold the bail down firmly against the covering and thus lock the covering on the receptacle. When it is desired to empty the receptacle, the bail may be forced upwardly and from between said clamps and the covering then elevated to the position shown in Fig. 2, the sides of the bail passing through the slots 5, 5, and the bail may then be forced down to the position show in Fig. 3, when the covering will assume a vertical position and rest against the rear side of the receptacle, as shown in said Fig. 3. Near the bottom of the receptacle is a grip 9 by means of which the receptacle may be elevated and emptied into a wagon or other receptacle. The front side of the receptacle 1 is reinforced by means of vertically extending ribs 10 which are provided to prevent the receptacle from being bent or disfigured when striking against the wagon body or other receptacle into which the garbage is emptied. When the receptacle 1 has been emptied, the bail 6 may then be again elevated and the covering will, of its own accord, slide down the bail and assume its normal position on said receptacle and may then be locked thereon by forcing the bail again between the clamps 8, as shown in Fig. 1.

A garbage receptacle constructed as herein described and as shown in the drawings filed herewith and made a part hereof, will be cheaply and easily constructed and will not be so liable to become accidentally uncovered as similar devices now in common use, and the covering will not be so liable to become broken off of the receptacle, as would be the case if said covering was hinged directly to the receptacle in the manner of the ordinary garbage receptacle.

What I claim is:—

A device of the character described, including a receptacle, a vertically extending brace secured upon each side of said receptacle, the upper ends of said braces extending above the receptacle, a covering having a slot in each side thereof through which the upper ends of said braces extend, a bail hinged upon each side to the upper ends of said braces, arranged so that said covering may be moved up and down thereon, a brace extending across the covering and having up-turned ends forming clamps between which said bail may be forced when the covering is upon the receptacle and which will engage against said bail and lock the covering on the receptacle.

In testimony whereof I have signed my name to this specification in the presence of two subscribing witnesses.

WILLIAM L. LUBBOCK.

Witnesses:
E. L. CATHEY,
MAY MONTGOMERY.

Copies of this patent may be obtained for five cents each, by addressing the "Commissioner of Patents, Washington, D. C."